April 10, 1934.   J. W. PLACE ET AL   1,954,425
DIFFERENTIAL GAUGE
Filed July 29, 1930    2 Sheets-Sheet 1
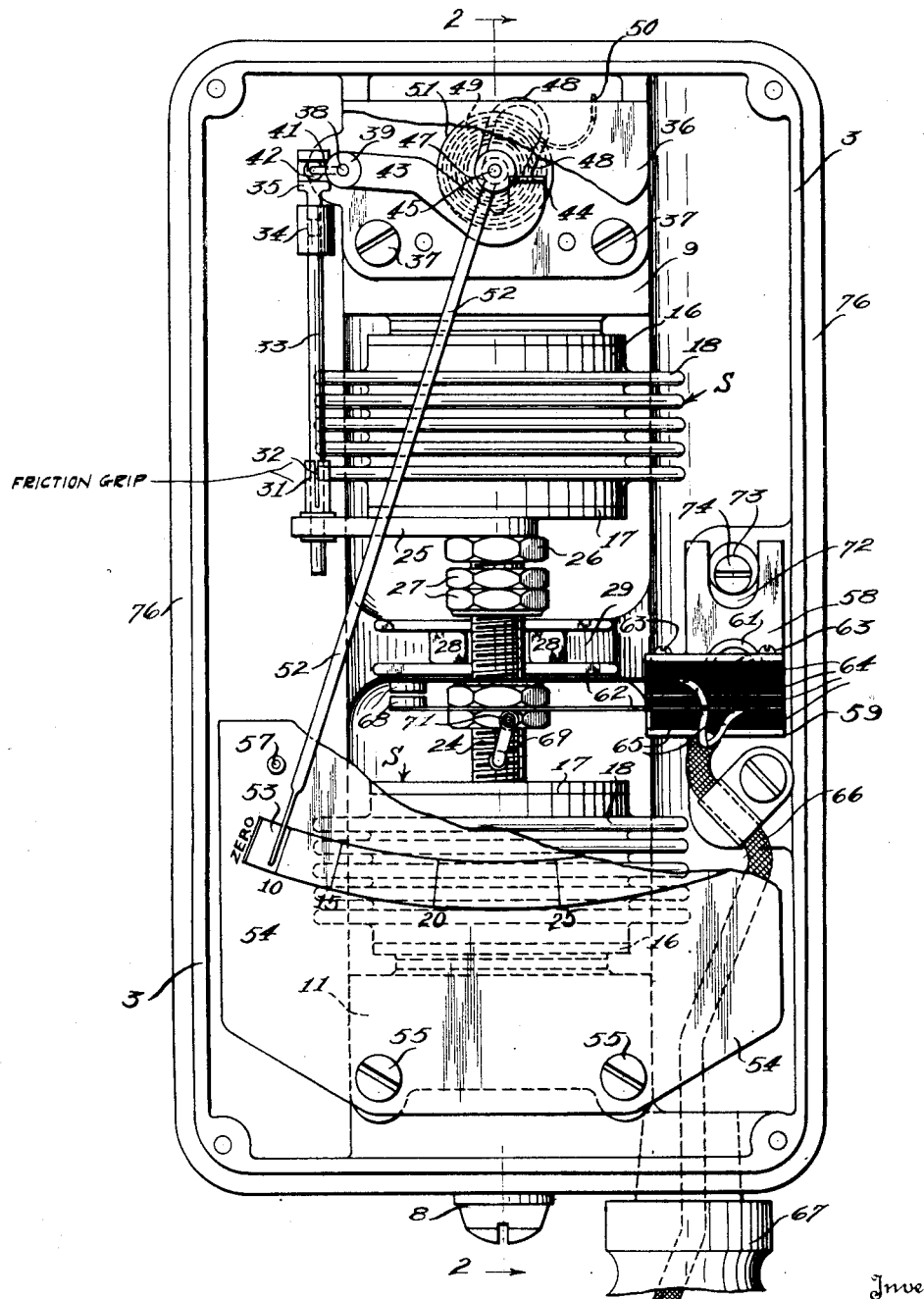
Inventors
Josiah W. Place
Emerson Aschenbach
By
Strauch & Hoffman
Attorneys

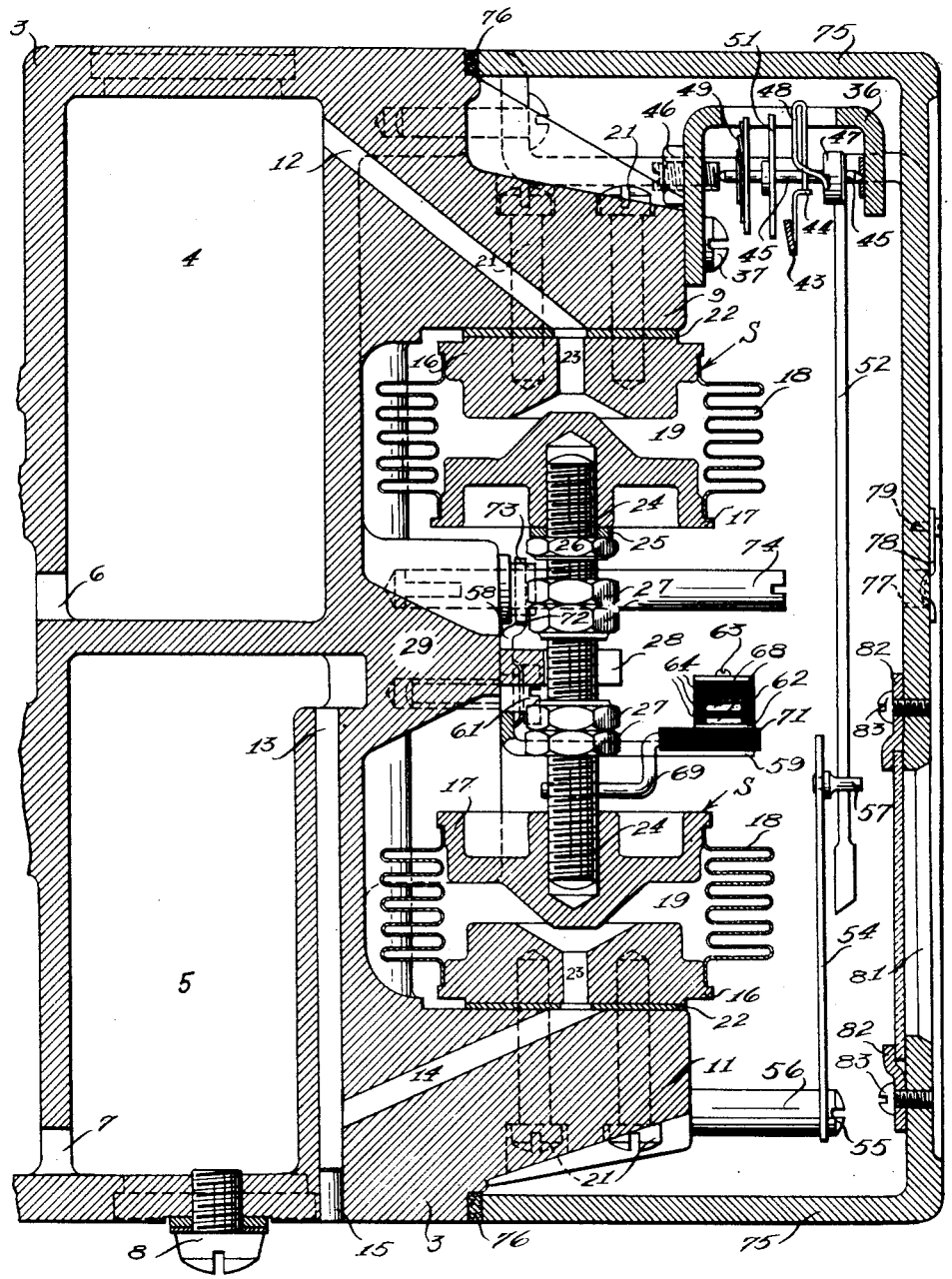
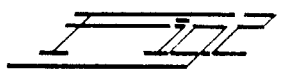
Inventors
Josiah W. Place
Emerson Aschenbach

Patented Apr. 10, 1934

1,954,425

UNITED STATES PATENT OFFICE 1,954,425

DIFFERENTIAL GAUGE

Josiah W. Place, West Orange, N. J., and Emerson Aschenbach, Sellersville, Pa., assignors to United States Gauge Company, Sellersville, Pa., a corporation of Pennsylvania Application July 29, 1930, Serial No. 471,562

9 Claims. (Cl. 73—110)

This invention relates to differential gauges for the measurement of differences in pressures or degrees of vacuum at two different points. The fluid or fluids at the said two points may consist of gas only, liquid only, or of a gas and a liquid. The term "pressure" as hereinafter used includes all pressures down to absolute vacuum, and the term "fluid" is hereinafter used in its broad sense to cover single or combined liquids or gases.

The differential gauge of this invention is of a type wherein an indicating pointer is actuated by pressure differences in a pair of pressure-responsive devices such as bellows, diaphragms or the like, each of such devices receiving a fluid so that when one fluid pressure rises above or falls below the second fluid pressure the pointer is actuated.

It is a primary object of this invention to provide a device of the above character which shall be extremely sensitive and accurate and yet not subject to derangement or damage from vibratory causes or from sudden and abnormal pressure fluctuations.

Another object of the present invention is to provide a differential gauge wherein two pressure-responsive devices are securely anchored in spaced relationship and rigidly interconnected by the means which they operate. In this connection, it is a further object to mount the pressure-responsive devices and the movement, actuated by said interconnecting means, upon a common base, whereby all of these elements will be firmly and accurately supported in a definite relationship to obtain great sensitivity and to eliminate the undesirable influences of vibration. These parts are made relatively heavy and the pointer very light whereby the latter is "deadbeat" in operation.

Another object of this invention is to provide an improved movement, i. e., mechanism for transmitting forces from the pressure-responsive devices to the pointer; and to so design said movement that a convenient adjustment for the pointer is provided.

A further object of the present invention lies in the provision of air chambers or traps in one or both of the fluid lines leading to the pressure-responsive devices so that the latter receive air only and yet respond to the pressure of almost any one of a great variety of fluids. These air chambers provide traps for the deposit of dirt, and they prevent liquids from entering the devices to damage the latter by freezing or corrosion.

A still further object of our invention is to equip a differential gauge with an alarm, preferably of the electrical type, that will function when a predetermined pressure differential is reached. In this connection it is an object to provide the alarm mechanism with means for readily and conveniently adjusting it.

Other objects are to design a special unitary casting containing air chambers and serving as a mounting block for the movement and the pressure-responsive mechanism; to form passages in the casting for interconnecting the air chambers and bellows; and to provide integral stop means on the casting for limiting the movement of the bellows.

Further objects of our invention will appear in the following description and the appended claims, when viewed in the light of the accompanying drawings, wherein:

Figure 1 is a front elevational view, of a preferred form of the invention, as would be seen when looking upon the right side of Figure 2, with the cover plate removed and certain parts broken away for clarity of illustration.

Figure 2 is a longitudinal sectional view taken on the plane indicated by line 2—2 in Figure 1, with the cover plate mounted in position and with the pointer and the indicating plate shown in side elevation.

With further reference to the drawings, wherein like numerals are employed to designate like parts, a casting 3 provides a chamber-forming block designed to support the pressure-responsive mechanism. A pair of air chambers 4 and 5 preferably are formed in one side of the block, these chambers being connected with a source or sources of fluid pressure by way of ports 6 and 7 respectively. A drain plug 8 is provided at the bottom of chamber 5 for the purpose of removing any sediment or condensate that may accumulate in said chamber. In like manner a drain plug, not seen, may be positioned adjacent the bottom of chamber 4.

A pair of supporting lugs 9 and 11, formed integral with the top and bottom respectively of the casting, project outwardly in parallelism to provide reactance means for mounting differential pressure-responsive devices about to be described. A passage 12 is formed in the casting between the chamber 4 and the lower face of the lug 9, this passage opening into said chamber at the top thereof in order that only the clean entrapped air may serve to transmit pressures from the chamber to the corresponding pressure-responsive device. In like manner a passage 13 opens into the top of the chamber 5, this passage being intersected by a passage 14 that terminates on the upper face of the lug 11. A plug 15 seals the lower end of the passage 13.

Each of the aforementioned pressure-responsive devices comprises a bellows assembly or structure S. Each bellows assembly consists of a stationary block 16 and an actuating block 17, which blocks are interconnected by a thin metallic bellows 18 to form an expansible chamber 19. The block 16 is securely drawn against its corresponding supporting lug, by screws 21 which extend through said lug into the block, and is sealed with respect to the lug by a soft metal washer 22 which is compressed during the drawing operation. Passages 23 are provided in the blocks 16 and washers 22 to register with the passages 12 and 14 respectively, thus to place the chambers 19 in communication with their corresponding air chambers 4 and 5.

The actuating blocks 17 are rigidly interconnected by a threaded bolt 24 the opposite ends of which are screwed into said blocks. An arm 25, forming part of a movement yet to be described, has one end thereof receiving the bolt and locked securely against the upper block 17 by a nut 26. When the pressures in the bellows chambers are equal the forces with which the blocks 17 are thrust toward each other are equal and no movement of the arm 25 results. When, however, one of the pressures exceeds the other, the arm will be moved in a direction corresponding to the greater thrust and with a magnitude proportionate to the pressure differential. Excessive movement of the blocks 17 is prevented by two pairs of nuts 27 locked upon the bolt 24 in predetermined spaced relation with respect to a pair of stop elements 28. These elements are the stationary fingers of a bifurcated projection 29 integral with the casting 3. The bifurcation is large enough to permit free reciprocation of the bolt therethrough, but so small as to be engaged by the nuts 27 upon the application of such pressures to the bellows chambers as to cause abnormal or undesirable pressure differentials. Movement of the bolt 24 and the arm 25 is transmitted to an indicating device, as follows:

The free end of arm 25 is provided with an eye which receives and rigidly carries a short sleeve 31. The sleeve is split as at 32 and is somewhat springy so that there is a tendency for its split sections to be urged toward each other. A connecting rod 33 has one end thereof projecting through and frictionally gripped by the sleeve, this connection being sufficiently yieldable to permit the rod to be moved axially to vary its effective length. Such variation results in a convenient method of adjusting the gauge mechanism to render it accurate in operation. The other end of the rod 33 is screwed into a connector 34 which in turn carries an actuating fork 35.

A bracket in the form of a U-shaped plate 36 is rigidly secured by screws 37 upon the lug 9 adjacent the fork 35. A horizontal spindle 38 is rotatably supported by the plate 36 and has fixed thereon a collar 39. A bent arm 41 has one of its ends rigidly mounted in the collar and its other end shaped to provide a ball 42 that freely fits within the slot of the actuating fork 35, whereby a flexible universal connection is made between the rod 33 and the arm 41. A pointer actuating link 43 has one of its ends secured to the collar 39 and spindle 38 for oscillation therewith and its other end bent to form a flat horizontal finger 44. This link is curved as shown to avoid engagement with a second spindle 45.

The spindle 45 is horizontally disposed adjacent the finger 44, and mounted for oscillation between one side of the bracket 36 and an adjustable screw and nut mechanism 46 that is supported by the opposite side of the bracket. A collar 47 is secured upon the spindle 45 and it in turn has rigidly secured thereto one end of a special curved wire 48. The opposite end of the wire is adapted to be engaged by the finger 44, so that counterclockwise oscillation of spindle 38 will cause a corresponding movement of the spindle 45. Clockwise oscillation is imparted to spindle 45 by a light hair spring 49 one end of which is connected to the spindle and the other end of which is fastened to the bracket, as at 50. A balancing and dampening wheel 51 is secured to the spindle 45 adjacent this spring to guard it from entanglement. The oscillation of the spindle 45 is utilized to oscillate a pointer 52 that has one of its ends set into the collar 47 and its other end adapted to swing over a scale 53 provided on a plate 54. The latter is mounted in position by a pair of screws 55 which project through spacing sleeves 56 into the casting lug 11. The scale is so divided and numbered that it cooperates with the pointer to show correct indications of the relative or differential pressure conditions of the fluid in the inlet ports 6 and 7. A stop pin 57 is set in the plate in line with the zero position of the pointer to prevent the spring 49 from urging the latter beyond said zero position when the pressures are equal.

The movement and indicating means just described are designed for use where the pressure in one bellows assembly (in this case the lower one) is always equal to or greater than the pressure in the other. It may be found desirable to indicate pressure differentials where either of the pressures at times rises above the other, in which event the illustrated instrument may be changed slightly to meet such a situation by substituting a scale wherein the zero point is centrally disposed and by redesigning the movement so that the rod 33 may actuate the pointer in either direction from its zero position.

A remote signal in the nature of an electrical alarm system may be associated with the instrument. As illustrated an angle bar, comprising vertical and horizontal legs 58 and 59 respectively, is pivoted upon the casting 3 by a screw and washer assembly 61. The leg 59 has a pair of copper strips 62 secured to its free end by screws 63, the strips being spaced from each other and insulated by layers of non-conducting material 64. These strips 62 are connected with a pair of feed wires 65 housed within a conduit 66 that is led into casting through a coupling 67. The strips project to a position adjacent the bolt 24 and at their ends are provided with complemental contact points 68 which, when brought into engagement will close a circuit and actuate a signal or alarm at some point outside the instrument. The points 68 are normally out of contact but are adapted to be brought together when a predetermined pressure differential exists. For example, in the drawings the points are about to be engaged and contact will be made when the pointer reaches zero position because of the pressure exerted against one of the copper strips 62 by an actuating stem 69 rigidly carried by the bolt 24. The stem is sheathed by a rubber sleeve 71 to prevent short-circuiting. The actuating stem may be rearranged, if desired, to close the contact points when the pressure differential reaches or exceeds a predetermined value above zero.

The alarm mechanism may be adjusted for proper operation or to obtain a signal at any one of an infinite number of predetermined pressure conditions. For this purpose the free end of the leg 58 is provided with a slot 72 which receives a cylindrical body 73 formed integral with, and eccentric to, a stem 74 that is rotatably mounted in the casting 3. The outer end of the stem is designed to receive a tool whereby the stem may be turned to rotate the cam 73. Shifting of the cam causes the leg 58 to swing about its pivot to move copper strips 62 toward or away from the rubber sleeve 71 of the actuating stem 69.

The mechanism thus far described is completely housed by a cover 75 that is drawn against a gasket 76 fitted around the edges of the casting 3. A hole 77, in alignment with the adjusting stem 74, permits the latter to be turned by a screwdriver without removal of the cover. A clip 78, pivoted on a screw 79, normally is swung into position to close the hole 77. An aperture 81 in the cover adjacent the scale plate 54 renders the scale and the end of the pointer visible from without the instrument. A transparent plate is secured against the edges of the aperture by a series of clips 82 secured in position by screws 83. The complete device is extremely compact and adapted for use wherever such an instrument is desired.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What we claim and desire to secure by United States Letters Patent is:—

1. In a differential gauge, a pair of pressure-responsive devices, a rigid and inflexible supporting means common to said devices, each of said devices being firmly anchored at one side to said supporting means and connected at its other side with the other of said devices by an inextensible element provided with stop means fixed thereon for movement therewith, stationary stop means on said supporting means for cooperation with said movable stop means to limit the movement of said inextensible element, means for subjecting said devices to variable fluid pressures, and indicating mechanism designed for actuation by said pressure-responsive devices.

2. In a differential gauge, supporting means providing a pair of air chambers each designed for connection with a fluid source, a pair of pressure-responsive devices mounted in opposed relationship on the ends of said supporting means to receive air from the upper ends of the respective air chambers, means at the bottom of at least one of said chambers for removing condensate or dirt therefrom, and means actuated by said pressure-responsive devices for indicating the pressure conditions set up in the latter.

3. In a differential gauge construction, a rigid body forming a pair of air chambers and a pair of integral supports, a pair of bellows firmly mounted on the respective integral supports and in communication with the respective air chambers, said bellows having elements movable in response to pressure variations within said chambers, a link rigidly interconnecting said elements for movement as a unit, and indicating means actuated by the movement of said elements and said link.

4. In the combination defined in claim 3, the connections between said bellows and said chambers comprising passages formed in said supports, said passages opening into said chambers at points spaced above the floors of the latter.

5. In a pressure gauge, a supporting member, pressure-responsive mechanism firmly mounted on said member, an indicator and a movement secured substantially as a unit upon said supporting member independently of said mechanism, said movement being designed to actuate said pointer and comprising: a pivoted element having an extension pivotally connected to said pressure-responsive mechanism and provided with an actuator, means for pivoting said indicator upon said supporting member, and a member carried by said means and designed to swing with said indicator, said swinging member being designed for engagement by said actuator for actuation thereby in response to pressure variations in said pressure-responsive mechanism.

6. A differential gauge comprising a supporting means, a pair of expansible pressure-responsive devices mounted in alignment on said supporting means and designed to tend to expand toward each other upon increase in their internal pressures, a link rigidly interconnecting said devices, an arm extending radially from said link and adapted to reciprocate with the latter, a movement mounted adjacent one of said devices, a rod interconnecting said arm and said movement, a scale mounted adjacent the other of said devices, and a pointer adapted to be actuated by said movement and designed to swing over said scale.

7. In the apparatus defined in claim 6, said supporting means comprising a block having a pair of air chambers formed therein, said air chambers being in communication with the respective pressure-responsive devices and being provided with openings for connection with a fluid source.

8. In combination, a base structure having a pair of spaced rigid ends; differentially-expansible, pressure-responsive devices mounted on said rigid ends in opposed relationship; a scale mounted on one of said rigid ends; a pointer for the scale pivotally mounted on the other rigid end; an element between the pressure-responsive devices for actuation in response to differential movement thereof; and means for transmitting movement of said element to said pointer.

9. In combination, a base including standards projecting therefrom, differentially expansible bellows mounted on said standards and facing each other, a scale mounted on one of said standards, a pointer for the scale pivotally mounted on the other standard, an element between the bellows responsive to differential movement thereof, and means for transmitting movement of said element to said pointer.

JOSIAH W. PLACE.
EMERSON ASCHENBACH.